Oct. 17, 1972   B. E. HOGAN, JR   3,698,975
TIRE RETREADING METHOD
Filed March 1, 1971   2 Sheets-Sheet 1
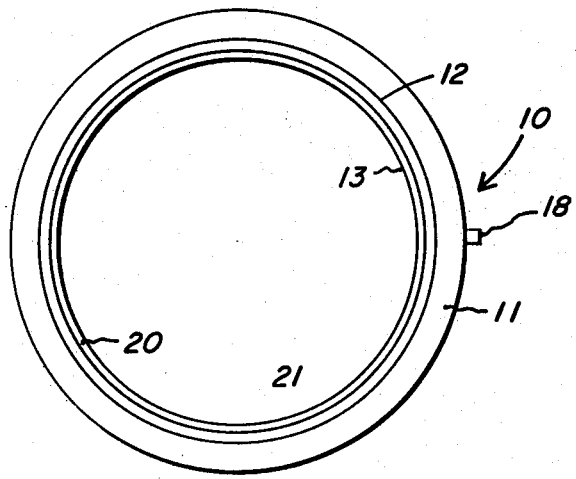
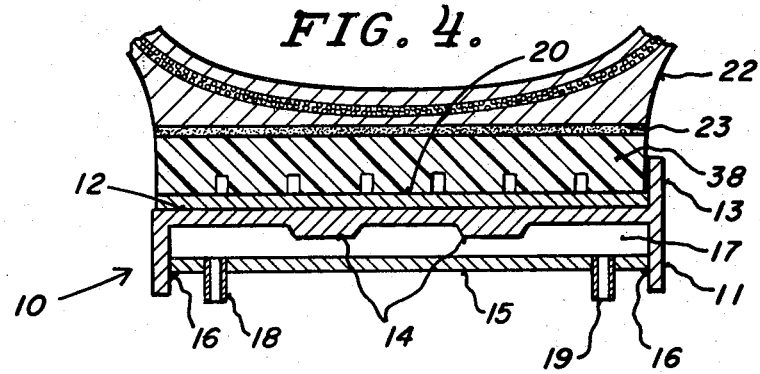
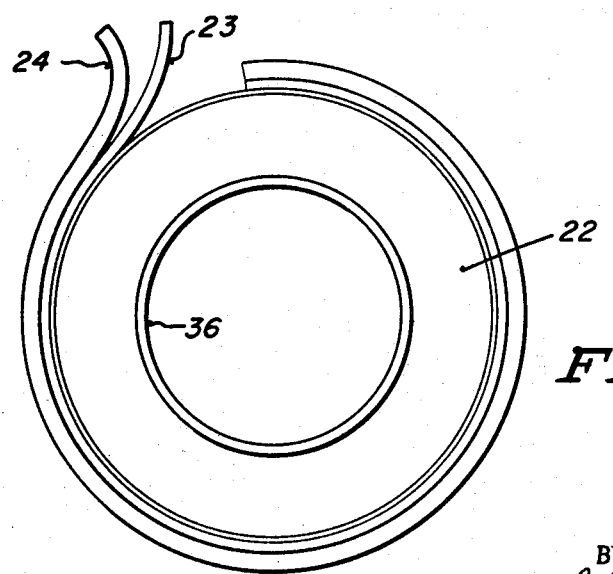
INVENTOR.
Bernard E. Hogan, Jr.
BY
Schroeder Siegfried & Ryan
ATTORNEYS Oct. 17, 1972     B. E. HOGAN, JR     3,698,975
TIRE RETREADING METHOD
Filed March 1, 1971     2 Sheets-Sheet 2
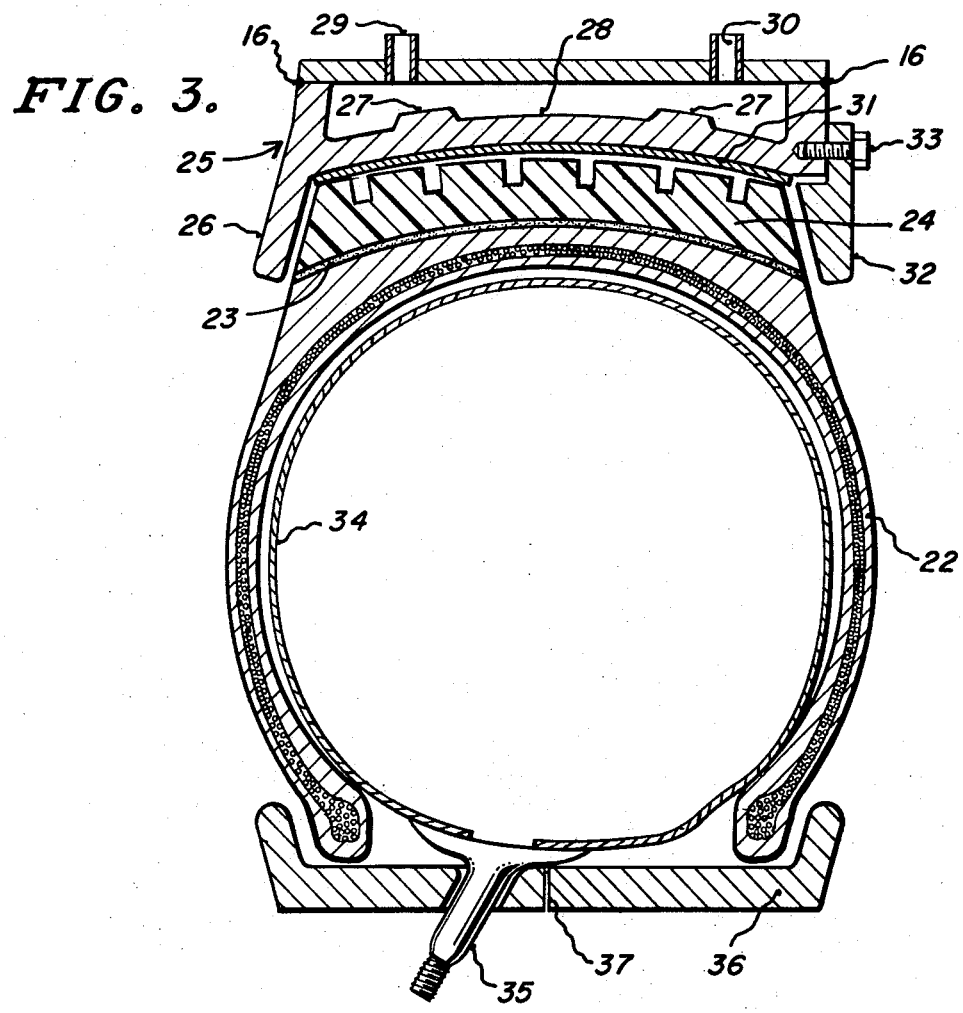
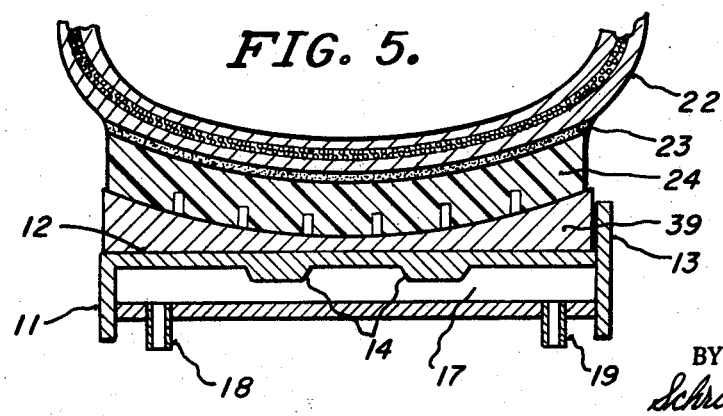
INVENTOR.
Bernard E. Hogan, Jr.
BY Schroeder Siegfried & Ryan
ATTORNEYS

United States Patent Office 3,698,975
Patented Oct. 17, 1972

3,698,975
TIRE RETREADING METHOD
Bernard E. Hogan, Jr., 358 Carol Court,
North Mankato, Minn. 56001
Filed Mar. 1, 1971, Ser. No. 119,734
Int. Cl. B29h 5/04, 17/36
U.S. Cl. 156—96
5 Claims

ABSTRACT OF THE DISCLOSURE

A method and apparatus is provided for recapping of tires utilizing precured tread. The process and apparatus utilize heat applied from a curing band through the precured tread to cure the cushion gum intermediate the tread and the tire carcass, thereby bonding the two together without significant heating of the carcass sidewall. Adjustment means are provided for the band to compensate for variations in the outer diameter of the carcass being retreaded, as well as for permitting the same band to be used for flat and curved treads.

---

The present invention is directed to a method of bonding a precured tread to a tire carcass and to the apparatus used in the bonding method. Broadly, the invention utilizes a curing band having a heating means incorporated therein so that the heat that is utilized in bonding of the precured tread to the tire carcass is directed from outside of the precured tread, through the tread, and then to the bonding layer utilized for holding the precured tread to the carcass. As the heat is applied only through the surface of the precured tread, the sidewalls of the carcass are not heated to an elevated temperature.

One of the prior art techniques for retreading of tires has been to apply an uncured rubber layer to the rolling surface of a previously prepared tire carcass. A curing band is then placed about the outside of the tire over this layer of uncured rubber. The curing band has ridge elements on the internal surface, which are the means for producing tread configuration in the uncured rubber. By means of heating elements located on the outer side of the curing band, the rubber is first softened so as to take the impression of the tread ridges and is then, with passage of time, brought to a full cure. This process has the advantage of maintaining the sidewalls of the tire relatively cool during the forming of the tread, but the tread that is so formed does not have the high density of preformed tread. The resultant wear characteristics of the tread are inferior to precured tread of the higher density.

The use of precured tread in preparation of retreaded tires has also been known in the art. However, insofar as is known to me, such precured tread has always been applied to the tire carcass, following which a curing of the bonding agent which is to hold the precured tread to the carcass takes place in a heating chamber. The entire tire is placed in the chamber. Such a heating chamber utilizes elevated pressures and temperatures in order to cure the material that bonds the tread to the carcass. The resulting product possesses good wear characteristics insofar as the tread is concerned due to the high density precured tread that is used. However, the process has the disadvantage that the heating of the entire carcass during curing tends to deteriorate the tire carcass sidewalls. Also, as the entire tire assembly is heated, rather elaborate and expensive apparatus is required as compared to the simple apparatus of the present invention.

BRIEF DESCRIPTION OF THE DRAWINGS

FIG. 1 is a side elevational view of a curing ring in accordance with the invention;

FIG. 2 is a side elevational view of a tire carcass with a binding gum layer and precured tread partially applied thereto;

FIG. 3 is a cross-sectional view of one form of my invention with a tire carcass mounted therein ready for curing;

FIG. 4 is a cross-sectional view of a second form of my invention wherein a flat tread portion is applied to a tire carcass; and FIG. 5 is a cross-sectional view of a third form of my invention wherein a curved tread portion is applied to the tire carcass utilizing a heating ring of the same type as FIG. 4.

In the drawings, like parts will receive the same numerical designation in each of the figures.

Referring first to FIG. 1, there is illustrated a curing ring generally designated 10 in a side elevational view. The curing ring in the form illustrated in FIGS. 1, 4 and 5 consist of a steam heated annular ring 11, which is desirably of a metal such as aluminum having good heat transfer properties. Ring 11 has a flat inner surface portion 12 on the inner facing thereof, which is adapted to transmit heat from the ring 11 through the precured tread portion of the tire being recapped. At one edge of the inner facing of ring 11 and joining with surface 12 is a projection 13 which is utilized in aligning the ring member with the precured tread portion. Rather than a continuous projection 13, one may use a plurality of stud projections around the periphery of the ring 10. Member 11 will desirably be formed to have a pair of reinforcing rings 14 encircling the flat portion 12 to add strength thereto. These portions 14 in the preferred form of the invention will be cast metal that is formed at the same time as the main portion of ring 11. Alternatively, the ring members of the invention can be formed from sheet stock welded together where appropriate. However, for dimensional stability it is desirable that the inner portion of ring 10, including face 12, be a cast metal.

Completing ring 10 is a sealing ring 15 that is joined to ring 11 by means such as welds 16 to form a chamber 17 completely around the interior of the ring assembly 10. Entrance port 18 and exit port 19 are provided for introduction of steam into the ring member 10 to provide a heat source therefor. Members 18 and 19 are desirably threaded to provide a means of connecting a source of high pressure steam for circulation through chamber 17 to provide the desired heat. In actual use, the ports will be positioned so that the exit port will drain any accumulated condensed moisture from the ring.

Also illustrated in FIGS. 1 and 4 is a removable split ring member 20. As can be seen in the figures, ring 20 is of a diameter and configuration such that it fits readily within the confines of surface 12 and can be readily inserted or removed as required by flexing the ring slightly to reduce its diameter. The split ring 20 is particularly advantageous in adjusting for the differences within the individual carcasses. For one form of my invention, the tire carcasses will be of a specific tire size for a particular curing ring. However, there are occasionally individual differences within carcasses of the same size designation. Such differences are readily compensated for by use of an adjustable member such as ring 20. Ring 20 is desirably made of a heat conducting metal such as aluminum and the preferred form is one wherein there is a split such as is shown at 21 along the circumference of the ring to permit its ready insertion and removal from the principal part of the curing ring 11. Where the tire carcass plus tread diameter is the same as the internal diameter of ring 11, the ring member 21 will not be necessary.

The preparatory techniques of the invention are schematically illustrated in FIG. 2 wherein a tire carcass 22, which has been previously trued and balanced by removal of old rubber by the use of conventional grinding equipment for that purpose, has had placed over the outer trued surface two consecutive layers of material. Old rubber is removed to leave none of the original tread. The first of these two layers is a binding material 23 which may be a cushion gum uncured bonding rubber. A number of sources are available which supply such gums in sheet form. The sheets are supplied in coils and the individual layers of the coil are separated by a material such as paper treated so that it does not bond to the gum. Layer 23 is applied at the same station that the grinding and trueing take place so that it will be applied in alignment with the axis of the tire carcass. It is precut so as to conform to the desired width and of a length to end up with the two ends abutting to complete the ring. For the sake of illustration, the thickness has been exaggerated. Typically, this layer 23 will be about 1/32 inch thick. Thinner or thicker layers are possible. One source for such a material is the Firestone Tire and Rubber Company of Akron, Ohio. I have found that a material supplied under their designation 860–492 is particularly useful for the purposes of my invention. However, it should be understood that this material is for illustration only and that other equivalent materials are available which can be utilized for the same purpose.

A preformed tread 24 of suitable width and cut to a finished length so as to completely encompass the combined diameter of tire 22 and cushion gum 23 is then laid over the cushion gum. The tire tread 24 will desirably have a considerably higher density than that obtainable in the hot molding process wherein the treads are formed at the same time that the uncured tread rubber is bonded to the tire carcass. Such preformed tire treads are available from a number of sources. I have found that treads supplied by Harrelson Rubber Company of Asheboro, N.C. are satisfactory for the purpose. In forming tread 24 about the carcass 23, the tread is precut so that the ends are in abutting relationship after completion of the bonding. To insure that good bonding takes place, it is desirable to coat the abutting ends of tread 24 to insure that a bond takes place at this junction. One may use the same material as is used in the cushion gum layer 23 for this purpose. As layer 23 is relatively tacky, the combined assembly of the tire carcass 22, layer 23 and preformed tread 24 is held in fixed relationship of one layer to another during normal handling prior to curing.

It is generally desirable, although not required, to place an intervening adhesive cement layer over the surface of the carcass prior to application of layer 23. This adhesive layer may be applied by a number of techniques. I have found that a spray coated adhesive cement supplied by Firestone Tire and Rubber Company under their designation 860–077 is particularly useful for this purpose. This adhesive layer increases the bondability of layer 23 to tire carcass 22.

Turning to FIG. 3, there is illustrated in cross-sectional view a tire carcass 22 that has been prepared in accordance with the above description. In the particular form of the invention shown in FIG. 3, the precured tread 24 and the tire carcass 22 are of the type having a curved tread as opposed to a flat surface tread. In this form of my invention, I have formed the heating ring 10 of FIG. 1 so as to present a curved surface on the inside surface thereof conforming to the finished shape of the retreaded tire. The curing ring in FIG. 3 is generally designated 25 and has a projecting portion 26 along one edge thereof to act as an aligning member for the tread and tire assembly. As in the description with regard to FIG. 1, it is desirable to form the inner portion of curing ring 25 from an aluminum casting. Making the ring of a casting is preferable over a formed metal member, as a casting has less tendency to distort under heating conditions. The overall curing ring 25 has been formed so as to have reinforcing ridges 27 and a cavity 28 formed by joining ring 15 by welding to the inner portion. Cavity 28 provides the means through which the steam passes. Access means 29 and 30 are provided to allow for passage of the steam through the ring.

Also illustrated in FIG. 3 is a split ring member 31 which is an analogous member to that shown in FIG. 1 as ring 20. In this instance, however, member 31 has been shaped so as to conform with the curvature of curing ring 25. It should be realized, of course, that where the tire dimensions correspond to the interior diameter of the curing ring, there will be no necessity for the use of members such as 31.

On the opposite side of curing ring 25 to projection 26 is a rim 32. These act to align the tread and hold it in engagement with the tire carcass. Rim 32 may be permanent as is 26, or it may be detachably mounted by bolt 33 as shown. The purpose in this detachable member 32 is to permit more ready insertion of the tire carcass and tread assembly into the curing ring.

It will be apparent that the form of my invention illustrated in FIG. 3 provides for heating of the lateral edges of tread 24 due to the extension of flanges 26 and 32 along the sides of tread 24 to bonding layer 23. Rubber has relatively poor heat transfer characteristics compared to metals. The Handbook of Chemistry and Physics, 41st edition, at page 2433.7 gives in cal./sec./cm.$^2$ across a thickness of one centimeter when the temperature difference is 1° C. values of 0.00045 for rubber and 0.49 for aluminum. Thus, without the extensions 24 and 32 of curing ring 25 cushion gum layer 23 will reach a higher temperature at the center portion thereof than at its outer edges due to heat loss from the precured tread rubber occurring to the atmosphere at the outer portion. Members 26 and 32 being of high heat conductivity and extending substantially the depth of tread 24 provide heating at the sides of the tread thereby insuring that a uniform curing temperature exists for cushion gum layer 23 all across the width of the tread.

Conventional equipment in use in the tire retreading industry can be utilized for deforming the carcass and exterior tread assembly in its precured condition for insertion into the curing rings. Such equipment is available from Branick Manufacturing Corporation of Fargo, N. Dak. As this type of equipment forms no special part of the present invention, it will not be described further herein.

After carcass 22 and gum 23 and tread 24 are inserted within curing ring 25, an inner tube 34, having an inflating means 35, is inserted within the tire carcass 22. An inner rim member 36 of the quick demountable type is then placed through the center of the tire. This type of ring is well known in the art and consists of two connectable sections which are joined at a midpoint 37 and held together by means not shown.

After forming the assembly illustrated in FIG. 3, the inner tube is inflated to approximately 170 p.s.i. pressure to insure that the preformed tread 24, gum 23 and tire carcass 22 are firmly in engagement and pressed outwardly against the curing ring 25. Steam is then introduced into the curing ring 25 by means of the ports 29 and 30 under temperature and pressure conditions needed to establish the desired temperature for curing of layer 23 to bond the assembly together. For the materials designated above, I utilize a steam pressure of about 65 p.s.i., which achieves a temperature of 298° F. within the curing ring. The temperatures for the specific materials described will be desirably in the range of 250–300° F. Heat from the curing ring 25 passes through its heat conducting walls through tread 24 and brings about a curing of layer 23, accomplishing a bond of tread 24 to carcass 22. The precise time for cure will depend to some degree upon the overall thickness of tread 24. I have found that times of from about one and a half to two hours brings about the desired cure.

It should be noted that the temperature of the sidewalls of carcass 22 is maintained at relatively low temperatures, as all of the heat of the system is introduced from the periphery by curing ring 25 and the walls of carcass 22 are in contact with the ambient air and cooled thereby. A positive bond and cure is achieved without the necessity for heating of the carcass walls. Thus, deterioration of the sidewalls does not take place. The tread which is joined to the carcass, having been formed under conditions that permit a high density material for the tread, has markedly superior wearing characteristics to that tread formed by use of uncured rubber that is shaped during the curing operation to form the tread.

In FIG. 4, there is illustrated in cross-sectional view a tire curing ring 10 being utilized to bond a flat precured tread 38 to a carcass 22 with an intermediate layer of the gum 23. In the illustration of FIG. 4, substantially the same principles are utilized as is illustrated in FIG. 3, with the exception of the shape of the curing ring. Flat treads in accordance with FIG. 4 are commonly in use on truck tires and to some degree are also found in automobile tires. The curing ring of FIG. 4 is somewhat simpler in configuration than the curing ring of FIG. 3.

Referring now to FIG. 5, there is illustrated in cross-sectional view yet another form of my invention. In this form of the invention, the heat supplying portion of the curing ring 11 is of the same configuration as that illustrated in FIGS. 1 and 4, having a flat interior surface 12. However, in the showing of FIG. 5, a shim member 39 is formed to have a curved interior surface to conform to a curved preformed tread portion 24. In this regard, a curing ring is provided which substantially accomplishes the purposes of the curing ring of FIG. 3. As can be readily seen, a curing ring can be adapted to operate with either curved or flat tread by appropriate selection of a split ring corresponding to 39. Likewise, tire carcasses of various sizes can be used in a master ring 11 by introducing appropriate split ring inserts.

Other variations of my invention will be apparent upon a consideration of the foregoing description. For example, one can substitute electrical heating for the steam heating that has been illustrated in each of the above descriptions. Depending upon the equipment available to the retreader, such electrical heating means may be preferable. In the use of electrical heating means, appropriate thermostatic temperature control will be required to maintain the desired temperatures.

I claim:
1. The method of retreading a tire carcass comprising:
   (a) treating a tire carcass to provide a uniform surface across and around the outer periphery thereof,
   (b) applying a heat curable binder substance to said treated surface,
   (c) applying an elongated strip of precured tread rubber having a substantial thickness across the width thereof over the surface of said binder substance and entirely around the circumference of said tire carcass to form a tire assembly,
   (d) placing a heat conducting metal annular band, having a smooth interior surface and heat conducting flanges projecting inwardly from the outer edges thereof a distance about equal to the thickness of the tread and including means for applying heat through said band, around the outer circumference and along the lateral edges of said tread,
   (e) inflating the interior of said carcass to force the carcass and tread into firm engagement and to hold said tread in heat conducting relationship with said band, and
   (f) applying heat to said assembly solely through said band, across and through the lateral edges of said tread rubber at a temperature and for a time sufficient to cure said binder, thereby bonding said tread to said carcass while maintaining the sidewalls of said carcass at a substantially lower temperature than said tread.

2. The method in accordance with claim 1 wherein said heat curable binder is a layer of cushion gum in sheet form.

3. The method in accordance with claim 2 wherein the temperature of said band is from 250° F. to 300° F.

4. The method in accordance with claim 3 wherein said temperature is maintained for from about 1.5 to about 2.0 hours.

5. The method in accordance with claim 1 wherein the inflation pressure is about 170 p.s.i.

References Cited

UNITED STATES PATENTS

| 2,110,293 | 3/1938 | Fisher | 156—96 |
| 2,228,211 | 1/1941 | Heintz | 156—96 X |

FOREIGN PATENTS

| 555,976 | 9/1943 | Great Britain | 156—96 |

WILLIAM J. VAN BALEN, Primary Examiner

C. B. COSBY, Assistant Examiner

U.S. Cl. X.R.

156—129, 394; 264—326; 425—42, 46